(12) United States Patent  
Jessie, Jr.

(10) Patent No.: US 8,381,616 B2
(45) Date of Patent: Feb. 26, 2013

(54) PEDAL FOR TRICYCLES, BICYCLES, AND SIMILAR VEHICLES HAVING GRAPHIC DESIGNS

(75) Inventor: Donald K. Jessie, Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 709 days.

(21) Appl. No.: 12/472,878

(22) Filed: May 27, 2009

(65) Prior Publication Data

US 2010/0300245 A1 Dec. 2, 2010

(51) Int. Cl.
B62M 3/08 (2006.01)

(52) U.S. Cl. ...................................... 74/594.4

(58) Field of Classification Search ............... 74/560, 74/594.1, 594.4; 280/259; 482/57
See application file for complete search history.

(56) References Cited

U.S. PATENT DOCUMENTS

| 473,030 | A | | 4/1892 | Sweetland |
| 579,479 | A | * | 3/1897 | Goebler ........................ 74/594.4 |
| 959,160 | A | | 5/1910 | Pawsat |
| 973,065 | A | | 10/1910 | Pawsat |
| 2,548,988 | A | | 4/1951 | McDonald |
| 2,568,443 | A | | 9/1951 | Gerner et al. |
| 2,751,797 | A | | 6/1956 | Pearl |
| 3,067,536 | A | | 12/1961 | Brittsan |
| 3,683,461 | A | | 8/1972 | Weidemann |
| 3,798,997 | A | | 3/1974 | Konzorr |
| 3,811,339 | A | | 5/1974 | Konzorr |
| 3,859,867 | A | | 1/1975 | Haines et al. |
| 4,345,487 | A | | 8/1982 | Straker |
| 5,203,827 | A | * | 4/1993 | Nestrud ........................ 74/594.5 |
| 5,806,379 | A | | 9/1998 | Nagano |
| 5,927,155 | A | | 7/1999 | Jackson |
| 6,128,973 | A | | 10/2000 | Nagano |
| D481,974 | S | | 11/2003 | Evans |
| 6,647,826 | B2 | | 11/2003 | Okajima et al. |
| 7,013,754 | B2 | | 3/2006 | Milanowski |
| 7,472,625 | B2 | | 1/2009 | Hwa |
| 2003/0029270 | A1 | | 2/2003 | Milanowski |
| 2003/0192399 | A1 | * | 10/2003 | Milanowski ................. 74/594.4 |
| 2004/0237705 | A1 | | 12/2004 | Conarro et al. |
| 2008/0156140 | A1 | * | 7/2008 | Hwa ............................... 74/560 |

FOREIGN PATENT DOCUMENTS

DE 4203777 7/1993
JP 5200140 8/1993

* cited by examiner

*Primary Examiner* — Vicky Johnson
(74) *Attorney, Agent, or Firm* — Wood, Herron & Evans, LLP

(57) ABSTRACT

A pedal includes a pedal body configured for engagement with a person and defining a first major side and a second major side of the pedal. A first plate member engages the first major side and has a first outer surface. Similarly, a second plate member engages the second major side and has a second outer surface. At least one of the first or second outer surfaces includes a graphic design feature. The first and second plate members may be coupled to each other through openings in the pedal body. The graphic design feature may be carried on a graphic design element which is coupled to the first and/or second outer surface.

19 Claims, 2 Drawing Sheets

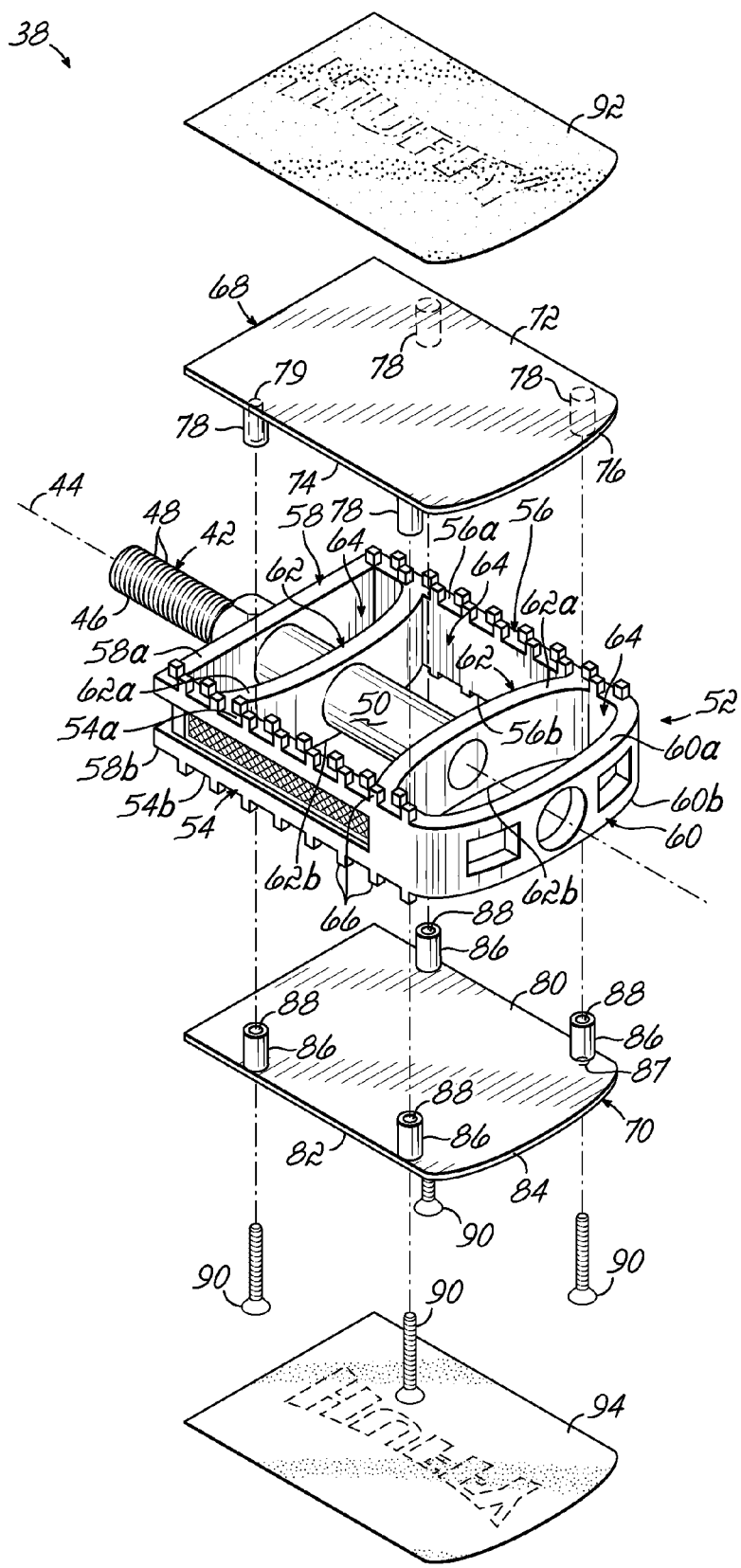
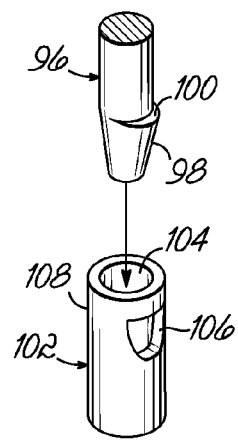
FIG. 3
FIG. 4

PEDAL FOR TRICYCLES, BICYCLES, AND SIMILAR VEHICLES HAVING GRAPHIC DESIGNS

TECHNICAL FIELD

The invention relates generally to pedals for tricycles, bicycles and the like and, more particularly, to pedals particularly suited to include graphic designs configured to enhance the aesthetic and/or marketing aspects of the pedaled vehicle.

BACKGROUND

A wide range of tricycles, bicycles, children's toys, and other human-powered vehicles transfer power to the vehicles through a pedal. Although such pedaled vehicles have been in existence for a very long time, these vehicles remain as popular and relevant today as in the past history of these types of vehicles. Accordingly, manufacturers continue to strive to improve all aspects of these vehicles. By way of example, manufacturers continually strive to improve the aesthetics of pedaled vehicles. This may include not only the overall design or appearance of the pedaled vehicle, but also includes new colors, color schemes, and graphic designs applied to the vehicle. Additionally, manufacturers continually strive to use the graphic designs to enhance the marketing aspects of the products to which the designs are applied.

In this regard, the graphic designs may be configured to appeal to certain consumers, such as, for example, toddlers, pre-schoolers, school-age children, pre-teens, teenagers, young adults, etc. of both genders. More particularly, the graphic designs may include colors or images particularly suited to catch the eye or attract the attention of a particular group of consumers to a product. These graphic designs may also be strategically located on the product so as to be viewed and noticed by the consumer. In this regard, some manufacturers locate graphic designs at certain "touch points" on the product. Touch points are locations on the product that come in contact with the consumer. Thus, for example, in regard to tricycles and bicycles, graphic designs may be located on the handlebar grips (i.e., where the rider puts his/her hands) and/or on the saddle (i.e., where the rider sits). It is believed that when the rider puts his/her body in contact with the product, they look at the targeted location and, as a result, view the graphic designs applied thereto.

Nevertheless, one touch point on a tricycle, bicycle, or other pedaled vehicle that has received little attention in regard to graphic design is the pedal. One reason for this is that conventional pedals lack a suitable surface on which to apply graphics. In this regard, many conventional pedals have a generally rectangular, box-like construction with a central hub or spindle, a pair of generally opposed side frame members, and a pair of opposed, relatively shorter end frame members. Conventional pedals are typically not solid, but include openings or gaps between the frame members and the central spindle. These openings generally reduce the amount of material required to form the pedal (thus reducing costs) and also provide a pathway for water, mud and other debris to fall from the pedal. The outwardly facing surfaces of the side frame members of the pedal are generally too small for graphic designs and typically include reflectors or the like in any event.

Thus, while conventional pedals are suitable for transferring the force from the rider to the vehicle, an opportunity to apply a graphic design to an essential touch point on the pedaled vehicle is missed. Accordingly, there remains a need for a pedal that is conducive to the application of graphic designs thereon.

SUMMARY

A pedal for addressing these and other shortcomings includes a pedal body configured for engagement with a person, such as his or her foot, and defining a first major side and a second major side of the pedal. The pedal body has a periphery and one or more openings that extend between the first and second major sides of the pedal. A first plate member engages the first major side of the pedal body and has a first outer surface that faces away from the pedal body. Similarly, the pedal includes a second plate member that engages the second major side of the pedal body and has a second outer surface that faces away from the pedal body. At least one of the first or second outer surfaces includes a graphic design feature thereon.

In one embodiment, the first plate member is coupled to the second plate member in such a manner as to clamp the plate members to the pedal body. Such a clamping technique may forgo the need to couple the plate members directly to the pedal body. The plate members may be configured to couple to each other through the openings in the pedal body. Additionally, the plate members may be configured so as to be positioned substantially completely within the periphery of the pedal body. The plate members may be releasably coupled to each other so as to allow for repeated engagement/disengagement. Alternatively, the plate members may be coupled in a semi-permanent manner, such as via a snap-fit connection.

The graphic design feature, which may include colors, letters, numbers, symbols, drawings, pictures, logos, impressions, and combinations thereof, may be integrated into the plate members themselves or applied thereto using a separate graphic design element. For example, a graphic design element, which carries the graphic design feature, may be coupled to at least one of the first or second outer surfaces. Exemplary graphic design elements may include heat transfer labels and grip tape, which may be adhesively coupled to the first and second plate members.

In another embodiment, an apparatus includes a frame for supporting a person on the apparatus, at least one movable element coupled to the frame, and a pedal movably coupled to the frame and operatively coupled to the at least one movable element. The pedal includes a pedal body configured for engagement with a person, a first plate member engaging the first major side of the pedal body, and a second plate member engaging the second major side of the pedal body, wherein at least one of the first or second plate members includes a graphic design feature thereon. By way of example, exemplary apparatus having such a pedal includes a tricycle or bicycle.

In still a further embodiment, a kit for adding a graphic design feature to a pedal includes a first plate member adapted to engage the first major side of the pedal, and a second plate member adapted to engage the second major side of the pedal, wherein at least one of the first or second plate members includes a graphic design feature thereon. The kit may further include at least one graphic design element adapted to be coupled to the at least one of the first or second plate members. In one embodiment, the kit may include a plurality of first and second plate members (e.g., for multiple pedals) and may further include a plurality of graphic design elements for allowing the consumer to select the desired graphic design feature to include on the pedal.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3 is a perspective disassembled view of the pedal shown in FIG. 1; and

FIG. 4 is a perspective view of a snap-fit connection in accordance with an alternate embodiment of the invention.

DETAILED DESCRIPTION

Figure 1:
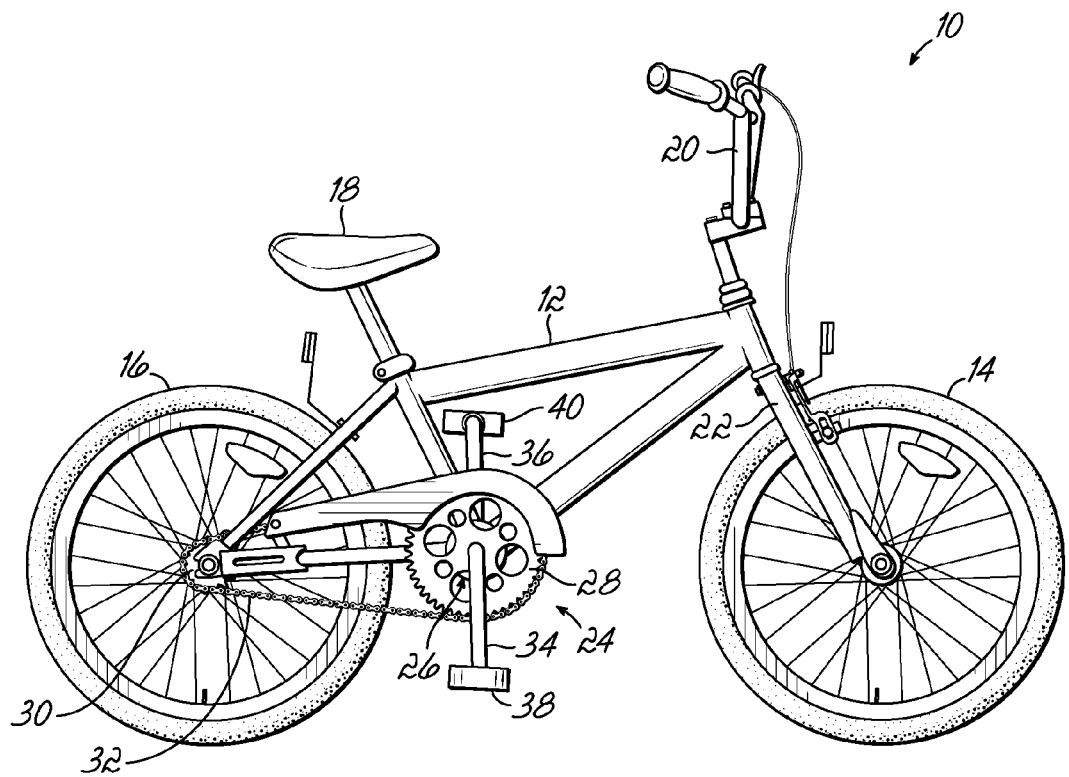
FIG. 1 is a side view of a bicycle having a pedal in accordance with an embodiment of the invention.

Referring now to the drawings and to FIG. 1 in particular, an exemplary embodiment of a pedaled vehicle is illustrated by bicycle 10. Bicycle 10 includes a frame 12 coupled to a front wheel 14 and a rear wheel 16. The bicycle 10 includes a saddle 18 coupled to frame 12 and on which a rider sits, a handlebar 20 operatively coupled to the front forks 22 for turning the front wheel 14, and a drive train 24 for transferring power from the rider (not shown) into motion of the bicycle 10. While the particular embodiment of the pedaled vehicle shown in FIG. 1 is a bicycle, those of ordinary skill in the art will recognize that aspects of the invention can be used on a wide range of pedaled vehicles including unicycles, tricycles, various children's toys, paddle boats, exercise bikes, and other types of pedal-powered vehicles. Thus, aspects of the invention are not limited to the particular embodiments shown in the figures, but apply to most any pedaled vehicle.

The drive train 24 of bicycle 10 includes a crank 26 having a front sprocket 28 attached thereto and capable of rotating relative to frame 12, a rear sprocket 30 coupled to the rear wheel 16, and a chain 32 operatively coupling the front and rear sprockets 28, 30. The crank 26 includes a pair of crank arms 34, 36 extending in opposite directions (e.g., 180° apart). A pedal 38, 40 is coupled to each of crank arms 34, 36, respectively, so as to extend outwardly from the crank arms 34, 36 in a generally perpendicular manner. In use, the feet of the rider contacts pedals 38, 40 so as to rotate crank 26. The rotation of crank 26, and thus front sprocket 28, is transferred to the rear sprocket 30 via chain 32 to rotate rear sprocket 30, and thus rear wheel 16, thereby propelling bicycle 10 in a forward direction.

Figure 2:
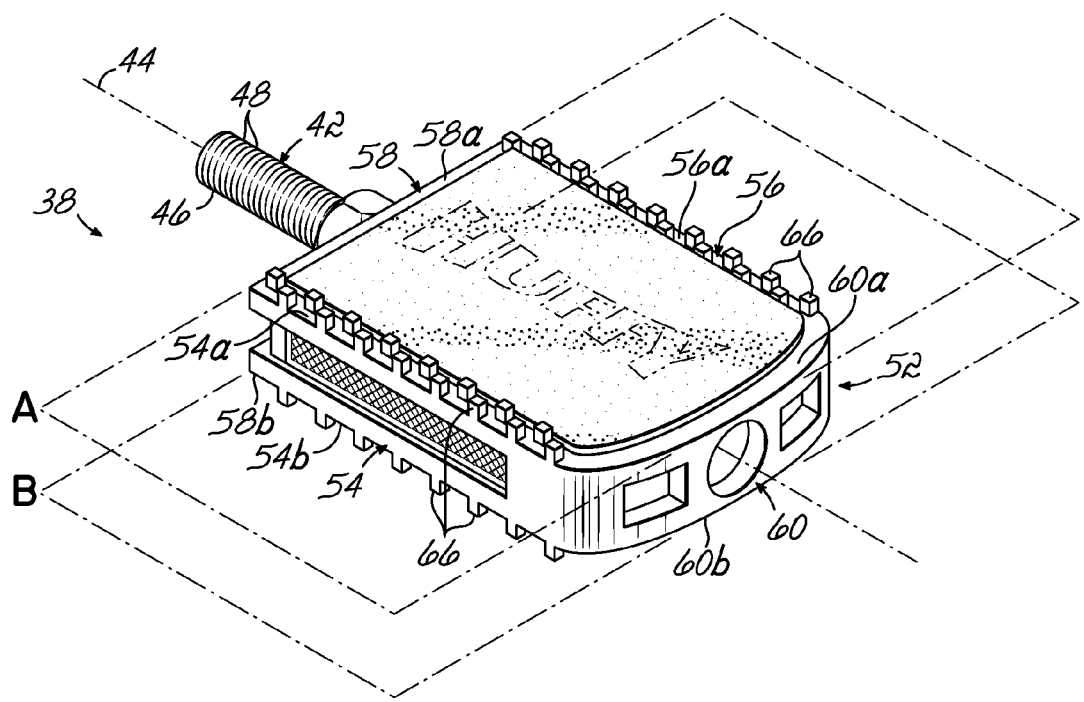
FIG. 2 is a perspective view of the pedal shown in FIG. 1 in an assembled state.

FIGS. 2 and 3 illustrate the construction of pedal 38 in accordance with an embodiment of the invention. It should be recognized that pedal 40 may have a similar construction. However, as the design of the pedals 38, 40 may be similar, only a detailed description of pedal 38 will be provided herein. Those of ordinary skill in the art will recognize the differences between the left and right pedal designs such that a description of one pedal will suffice as a description for the other pedal.

Pedal 38 includes a shaft 42 defining a central axis 44 and having a first portion 46 with threads 48 for threadably securing the pedal 38 to the crank arm 34. The pedal 38 includes a spindle 50 coaxially disposed about a second portion of shaft 42 and configured to rotate about central axis 44 in both a clockwise and counterclockwise direction. For example, as recognized by those of ordinary skill in the art, the pedal 38 may include suitable fittings, bearings, etc. (not shown) that allow the spindle 50 to rotate relative to shaft 42.

Pedal 38 further includes a pedal body 52 coupled to the spindle 50 and configured to receive the foot of the rider for rotating the crank 26. The pedal body 52 may have a wide range of sizes and configurations, but in one embodiment, may include a generally rectangular frame disposed about the spindle 50. Those of ordinary skill in the art will recognize, however, that the invention is not so limited as other shapes and configurations are possible. In this regard, and as illustrated in FIGS. 2 and 3, the pedal body 52 includes a pair of spaced apart side frame members 54, 56 disposed on opposite sides of spindle 50, and a pair of spaced apart end frame members 58, 60 coupled to side frame members 54, 56 to collectively define a frame about spindle 50.

In one embodiment, the side frame members 54, 56 may be generally planar and extend generally in the direction of spindle 50. For example, the side frame members 54, 56 may be generally parallel to the spindle 50, although the invention is not so limited. The first end frame member 58 extends between the two side frame members 54, 56 and intersects the spindle 50. In one embodiment, the first end frame member 58 may be generally perpendicular to the spindle 50. The second end frame member 60 may also extend between the two side frame members 54, 56. The second end frame member 60 may be generally planar (not shown) or alternatively, may be generally arcuate, as shown in FIGS. 2 and 3. Moreover, in one embodiment, the spindle 50 may intersect the second frame member 60 (not shown). However, as shown in FIG. 3, the spindle 50 may stop short of the second frame member 60.

The side frame members 54, 56 and end frame members 58, 60 include upper edge surfaces 54a, 56a, 58a, and 60a that are generally coplanar so as to define a first major side of pedal 38 which generally lies in a plane A. Similarly, these frame members include lower edge surfaces 54b, 56b, 58b, 60b that are generally coplanar so as to define a second major side of pedal 38 which generally lies in a plane B. Furthermore, pedal 38 may include grip-enhancing features that facilitate frictional engagement with the foot of the rider. In this regard, upper and lower edge surfaces 54a, 54b and 56a, 56b may include one or more projections 66 (e.g., nubs, ribs, etc) extending therefrom and out of planes A, B. This non-uniformity enhances gripping with an engagement surface associated with the foot of the rider (e.g., shoe, bare foot, etc.). Although not shown, those of ordinary skill in the art will recognize that the upper and lower edge surfaces 58a, 58b, 60a, 60b of the end frame members 58, 60 may also include grip-enhancing features.

In addition to the above, pedal 38 may include one or more internal support ribs 62 (two shown) extending between the spindle 50 and the side frame members 54, 56 to provide additional structural integrity to pedal 38. The support ribs 62 may be generally planar, or as shown in FIG. 3, may be generally arcuate. Moreover, the support ribs 62 may include upper and lower edge surfaces 62a, 62b that generally lie in planes A, B, respectively. The terms upper and lower are used herein to facilitate description of pedal 38 and should not be construed in any way to limit the pedals 38, 40 to any specific orientation or reference frame.

The construction of the frame members 54, 56, 58, 60 in combination with spindle 50 and support ribs 62, as described above, results in pedal 38 having one or more openings 64 extending therethrough and between the major sides of the pedal 38. As noted above, these openings, which are conventional in pedal designs, result in less material being used to form the pedal, as well as to provide for escape of water, mud, or other debris from the pedal. As can be appreciated from FIG. 3, and as explained above, these openings are not conducive to the application of graphic design features on the pedal. In this regard, such pedals lack suitable generally solid, planar surfaces on which graphic design features may be located.

To address this shortcoming, in one aspect in accordance with embodiments of the invention, pedal 38 includes a pair of plate members configured to be coupled to the pedal 38 so as to provide suitable surfaces for the application of graphic design features. In this regard, pedal 38 includes a first, upper plate member 68 configured to engage the first major side of pedal 38, and a second, lower plate member 70 configured to engage the second major side of pedal 38. These plate members 68, 70 define surfaces that are conducive to the application of graphic design features.

First plate member 68 includes a generally thin-plate body defining an upper surface 72, a lower surface 74, and a side surface 76 extending therebetween. As used herein, a thin-plate body refers to bodies wherein the characteristic dimension in one dimension (e.g., height) is significantly less than the characteristic dimensions in the other two directions (e.g., length and width). By way of example, it is contemplated that the height of side surface 76 may be between approximately 1.8 mm and approximately 2.54 mm. Moreover, while the length and width of the upper and lower surfaces 72, 74 may depend on the specific pedal being used, it is contemplated that the length may be between approximately 60 mm and approximately 80 mm, and the width may be between approximately 40 mm and 70 mm. These ranges are exemplary and may vary depending on the specific application. In one specific embodiment, for example, the length and width of the first plate member 68 may be approximately 70 mm and approximately 50 mm, respectively, while the height or thickness of first plate member 68 may be approximately 2.0 mm. As shown in FIG. 3, the lower surface 74 of first plate member 68 includes at least one, and preferably a plurality of tubular posts 78 extending therefrom. The posts 78 are strategically located on lower surface 74 so as to fit within openings 64 in pedal 38 when the first plate member 68 is engaged with the pedal 38. The posts 78 include a threaded bore 79, the purpose of which is explained in more detail below.

While the first plate member 68 may be formed from any suitable material, in one embodiment, the first plate member 68 may be formed from suitable engineering plastics, including without limitation, polypropylene, polyethylene, or other suitable materials. The first plate member 68 may also be formed using, for example, an injection molding process. However, those of ordinary skill in the art may recognize other methods for forming first plate member 68 within the scope of the present invention. In addition, the first plate member 68 is preferably substantially solid to facilitate application of the graphic design feature thereon. As used herein, substantially solid not only includes the first plate member 68 being completely solid and without holes, openings, voids, etc, but also includes the case where a relatively small fraction of the total area of at least the upper surface 72 has voids (e.g., between approximately 10%-15% void fraction). Furthermore, in one embodiment, at least the upper surface 72 of first plate member 68 is relatively smooth to aid in the application of the graphic design feature. In this regard, at least the upper surface 72 should be devoid of any recesses or protrusions that detract or interfere with the appearance or application of the graphic design feature.

In one embodiment, the shape of first plate member 68 generally corresponds to the shape of the frame members 54, 56, 58, 60. Additionally, the size of first plate member 68 may be generally smaller than the size of the frame members 54, 56, 58, 60. By way of example, in an exemplary embodiment, the first plate member 68 fits within the periphery of the frame members 54, 56, 58, 60 and may be supported by at least one of, and preferably a plurality of, upper edge surfaces 54a, 56a, 58a, 60a, and 62a. First plate member 68 may further be configured to not interfere with the grip-enhancing projections 66 on the pedal 38. In this regard, the width of first plate member 68 may be such as to fit between the projections 66 on side frame members 54, 56. Additionally, the height of the first plate member 68 may be less than the height of the projections 66 such that a portion of the projections 66 extend beyond (e.g., above) the upper surface 72 of the first plate member 68 to provide a grip-enhancing function.

Due to the symmetries typically involved in pedal designs, the second plate member 70 may have a construction similar to first plate member 68 and includes a generally thin-plate body defining an upper surface 80, a lower surface 82, and a side surface 84 extending therebetween. The upper surface 80 includes at least one, and preferably a plurality of tubular posts 86 extending therefrom. The posts 86 are strategically located on upper surface 80 so as to fit within openings 64 in pedal 38 when the second plate member 70 is engaged with to the pedal 38. The posts 86 are also strategically located so as to align with posts 78 of the first plate member 68.

In accordance with an exemplary embodiment of the invention, the first and second plate members 68, 70 may be secured to each other so as to effectively clamp the plates 68, 70 to the pedal 38. In this regard, and in one embodiment, the clamping is achieved without fastening the plate members 68, 70 to the pedal body 52 directly. Additionally, the coupling between the plate members 68, 70 may be achieved through the openings 64 in the pedal 38. Thus, in one embodiment, the coupling is also made within the periphery of the frame members 54, 56, 58, 60, though not necessarily so limited. To this end, and as illustrated in FIG. 3, the second plate member 70 includes apertures therethrough 87 that align with bores 88 in posts 86. In one embodiment, the apertures and bores 88 may be threaded. Alternatively, the apertures 87 and bores 88 may be unthreaded.

A fastener, such as screw 90, may be inserted through the apertures 87 and through bores 88 in posts 86. The screw 90 includes threads adapted to engage the threaded bores in posts 78. To this end, the end of the screw 90 may be inserted into the threaded bores 79 in posts 78 and tightened so as to couple the first and second plate members 68, 70 to pedal 38. Additionally, the apertures 87 and the heads of screws 90 may have a countersunk configuration such that the lower surface 82 remains relatively smooth and planar when the plate members 68, 70 are coupled to pedal 38.

The upper surface 72 of the first plate member 68 and the lower surface 82 of the second plate member 70, in addition to providing a relatively planar, smooth surface, are generally visible to the rider when the plate members 68, 70 are coupled to the pedals 38, 40 (and prior to the rider putting his/her feet on the pedals). Accordingly, these surfaces provide a suitable location for applying graphic design features to the pedal. More particularly, a graphic design feature may be associated with (e.g., incorporated into or applied to) at least one of the first or second plate members 68, 70. Graphic design features include a wide range of designs including, without limitation, colors, letters, numbers, symbols, drawings, pictures, logos, impressions, and combinations thereof configured to enhance the aesthetics and/or marketing value of the pedaled vehicle, such as bicycle 10.

In one embodiment, the graphic design features may be incorporated into the first and/or second plate members 68, 70 themselves, such as for example, being integrally formed therewith during formation of the plate members 68, 70 (not shown). By way of example, various letters, numbers, symbols, impressions, etc. may be formed in the plate members 68, 70 during the molding process. Additionally, the plate members 68, 70 may be formed from one or more colored materials (e.g., colored plastics) that provide the graphic design feature. Those of ordinary skill in the art may recognize other techniques for incorporating the graphic design feature within the plate members 68, 70 themselves.

In an alternative embodiment, however, a separate graphic design element may be utilized to apply the graphic design feature to at least one of the first or second plate members 68, 70. In this regard, and as illustrated in FIGS. 2 and 3, a first graphic design element, shown schematically at 92, may be coupled to the upper surface 72 of first plate member 68 and include a graphic design feature. Similarly, a second graphic design element, shown schematically at 94, may be coupled to the lower surface 82 of second plate member 70 and include a graphic design feature. The first and second graphic design features carried on graphic design elements 92, 94 may be the same or may be different from each other. Additionally, the graphic design feature(s) on pedal 38 may be the same or different than the graphic design feature(s) on pedal 40. Moreover, the graphic design elements 92, 94 may be coupled to the first and second plate members 68, 70 in any suitable manner, such as with adhesives, for example. Those of ordinary skill may recognize other ways to couple the graphic design elements 92, 94 to the plate members 68, 70 and be within the scope of the invention.

In one embodiment, the graphic design elements 92, 94 may include a heat transfer label which is adhered to the first and second plate members 68, 70. Such heat transfer labels are commercially available from numerous vendors, such as TransArt Graphics Co., Ltd., and are capable of having various graphic design features printed or otherwise applied thereon. In another embodiment, the graphic design elements 92, 94 may include grip tape. Grip tape is also commercially available from various vendors, including TransArt Graphics Co., Ltd., and is also capable of having various graphic design features printed or otherwise applied thereto. Grip tape also provides a generally rough or gritty outer surface. Thus, in addition to the projections 66, the grip tape may facilitate the frictional engagement between the pedal 38 and the rider's foot. These are only exemplary and those of ordinary skill in the art may recognize other labels, tapes, etc. capable of carrying a graphic design feature thereon and coupling to the plate members 68, 70.

In addition to the screw/threaded bore connection described above, the first and second plate members 68, 70 may be coupled via other connecting elements. For example, in an alternative embodiment, the first and second plate members 68, 70 may couple via a snap-fit connection. In this regard, and as illustrated in FIG. 4, the first plate member 68 may include at least one of, and preferably a plurality of, solid posts 96. The posts 96 include a tapered tip 98 and a crescent-shaped shoulder 100 adjacent the tapered tip 98. The second plate member 70 may include at least one of, and preferably a plurality of, tubular posts 102. Similar to the above, the posts 102 are located so as to align with posts 96 of the first plate member 68.

Posts 102 include a central bore 104 adapted to receive the tapered tip 98 of posts 96 therein and further include an aperture 106 located in a sidewall 108 thereof and spaced from an end of posts 102. In use, as the plate members 68, 70 are pushed together, the tapered tip 98 of posts 96 engage the central bore 104 of posts 102. The portion of the tapered tip 98 adjacent shoulder 100 is slightly larger than central bore 104.

Thus, as the members 68, 70 are pushed further together, the tapered tip 98 elastically deforms the central bore 104 allowing the shoulder 100 to pass therein. When the shoulder 100 reaches the aperture 106 in sidewall 108, the central bore 104 snaps back such that the crescent-shaped shoulder 100 projects into aperture 106. The structural elements described above provide an exemplary snap fit connection. Those of ordinary skill in the art may recognize other types of snap fit connections for coupling the first and second plate members 68, 70. Those of ordinary skill in the art may further recognize other types of connecting elements for coupling the first and second plate members 68, 70.

In one embodiment, the plate members 68, 70 may be coupled to the pedals 38, 40 during original manufacturing of the bicycle, tricycle, or other pedaled vehicle. In an alternative embodiment, however, a kit may be provided that allows graphic design features to be added to pedals of existing products. In this regard, a kit may include the first and second plate members 68, 70. Similar to above, the graphic design feature may be incorporated in the first and second plate members 68, 70 themselves (e.g., integrally molded therewith). Alternatively, however, the kit may also include first and second graphic design elements 92, 94 for each of the pedals (e.g., a set of two). In one embodiment, the graphic design elements 92, 94 may come pre-applied to the plate members 68, 70. In another embodiment, however, the graphic design elements 92, 94 may be separate and applied to the plate members 68, 70 by the consumer. In this way, for example, a kit may include several different graphic design elements with different graphic design features and the consumer may choose the particular graphic design features to apply to the plate members 68, 70.

In a similar manner, the graphic design elements 92, 94 may be supplied to the consumer as a separate product. In this way, the consumer may select and purchase the particular graphic design feature to place on the plate members 68, 70. Additionally, after a period of time, the consumer may purchase a different set of graphic design elements (with different graphic design features), and consequently change the aesthetics of the pedaled vehicle. Thus, for example, the consumer may remove the old graphic design element and apply a new graphic design element. Alternatively, the consumer may simply apply a new graphic design element over the old graphic design element.

In another embodiment, the connecting elements for coupling the first and second plate members 68, 70 may be configured to be selectively engaged/disengaged so as to permit coupling/removal of the plate members 68, 70 from the pedals 38, 40. By way of example, the screw/threaded bore connecting elements permit the plate members 68, 70 to be removed, using, for example, a screw driver or similar tool. In other embodiments, however, the connecting elements may be configured so that the plate members 68, 70 are not so readily removable. In this regard, the snap-fit connection described above is meant to be semi-permanent such that removal of the plate members 68, 70 would essentially destroy the connecting elements and the ability of the plate members to be coupled.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, the pedals and plate members described herein were generally flat or planar. However, some pedal designs may have major sides that are arcuate (e.g., major sides of pedals are generally concave). Aspects of the invention may apply to such pedals as well by, for example, forming the plate members to have a corresponding curvature. Thus, the various features of the invention may be used alone or in any combination depending on the needs and preferences of the user.

What is claimed is:

1. A pedal, comprising:
    a pedal body configured for engagement with a person and defining a first major side of the pedal and a second major side of the pedal opposite to the first major side, the pedal body having a periphery and defining one or more openings within the periphery of the pedal body that extend between the first and second major sides of the pedal;
    a plurality of projections positioned along the periphery of the pedal body on the first major side of the pedal;
    a first plate member engaging the first major side of the pedal body and having a first outer surface facing away from the pedal body; and
    a second plate member engaging the second major side of the pedal body and having a second outer surface facing away from the pedal body;
    wherein at least a portion of the projections extends beyond the first outer surface of the first plate member;
    wherein at least one of the first and second outer surfaces includes a graphic design feature thereon.

2. The pedal of claim 1, wherein the first plate member is coupled to the second plate member to clamp the plate members to the pedal body.

3. The pedal of claim 1, wherein the first plate member is coupled to the second plate member through the one or more openings in the pedal body.

4. The pedal of claim 1, wherein the first plate member is coupled to the second plate member using a snap-fit connection.

5. The pedal of claim 1, wherein the first and second plate members are releasably coupled to each other such that the plate members may be repeatedly engaged and disengaged without destroying the capability of the plate members to be coupled.

6. The pedal of claim 1, wherein the graphic design feature is selected from the group consisting of one or more colors, letters, numbers, symbols, drawings, pictures, logos, impressions, and combinations thereof.

7. The pedal of claim 1, further comprising a graphic design element coupled to the at least one of the first or second outer surfaces, the graphic design element including the graphic design feature.

8. The pedal of claim 7, wherein the graphic design element is selected from the group consisting of heat transfer labels and grip tape.

9. The pedal of claim 7, wherein the graphic design element is adhesively coupled to the at least one of the first and second outer surfaces.

10. The pedal of claim 1, wherein at least one of the first and second plate members is substantially solid.

11. The pedal of claim 1, further comprising a plurality of projections positioned along the periphery of the pedal body on the second major side of the pedal, wherein at least a portion of the projections extends beyond the second outer surface of the second plate member.

12. A pedal, comprising:
    a pedal body configured for engagement with a person and defining a first major side of the pedal and a second major side of the pedal opposite to the first major side, the pedal body having a periphery and defining one or more openings within the periphery of the pedal body that extend between the first and second major sides of the pedal;
    a first plate member engaging the first major side of the pedal body and having a first outer surface facing away from the pedal body; and
    a second plate member engaging the second major side of the pedal body and having a second outer surface facing away from the pedal body;
    wherein the first and second plate members are positioned so as to be completely within the periphery of the pedal body;
    wherein at least one of the first outer surface and the second outer surface includes a graphic design feature thereon.

13. An apparatus, comprising:
    a frame for supporting a person on the apparatus;
    at least one movable element coupled to the frame; and
    a pedal movably coupled to the frame and operatively coupled to the at least one movable element, the pedal comprising:
        a pedal body configured for engagement with a person and defining a first major side of the pedal and a second major side of the pedal opposite to the first major side, the pedal body having a periphery and defining one or more openings within the periphery of the pedal body that extend between the first and second major sides of the pedal;
        a plurality of projections positioned along the periphery of the pedal body on the first major side of the pedal;
        a first plate member engaging the first major side of the pedal body and having a first outer surface facing away from the pedal body; and
        a second plate member engaging the second major side of the pedal body and having a second outer surface facing away from the pedal body;
        wherein at least a portion of the projections extends beyond the first outer surface of the first plate member;
        wherein at least one of the first and second outer surfaces includes a graphic design feature thereon.

14. The apparatus of claim 13, wherein the apparatus is selected from the group consisting of tricycles and bicycles.

15. The apparatus of claim 13, wherein the first plate member is coupled to the second plate member to clamp the plate members to the pedal body.

16. The apparatus of claim 13, wherein the first plate member is coupled to the second plate member through the one or more openings in the pedal body.

17. The apparatus of claim 13, wherein the first and second plate members are positioned so as to be completely within the periphery of the pedal body.

18. The apparatus of claim 13, further comprising a graphic design element coupled to the at least one of the first and second outer surfaces, the graphic design element including the graphic design feature.

19. The apparatus of claim 11, further comprising a plurality of projections positioned along the periphery of the pedal body on the second major side of the pedal, wherein at least a portion of the projections extends beyond the second outer surface of the second plate member.

* * * * *

UNITED STATES PATENT AND TRADEMARK OFFICE
CERTIFICATE OF CORRECTION

PATENT NO. : 8,381,616 B2  
APPLICATION NO. : 12/472878  
DATED : February 26, 2013  
INVENTOR(S) : Jessie Jr.

Page 1 of 1

It is certified that error appears in the above-identified patent and that said Letters Patent is hereby corrected as shown below:

In the Claim:

Column 10,
Line 61, CLAIM 19 reads, "The apparatus of claim 11, further..." and should read --The apparatus of claim 13, further...--

Signed and Sealed this
Eighteenth Day of March, 2014

Michelle K. Lee
*Deputy Director of the United States Patent and Trademark Office*